Sept. 25, 1934.  M. O. PALMER  1,975,018
FISH CUTTING AND CLEANING MACHINE
Filed Nov. 5, 1929
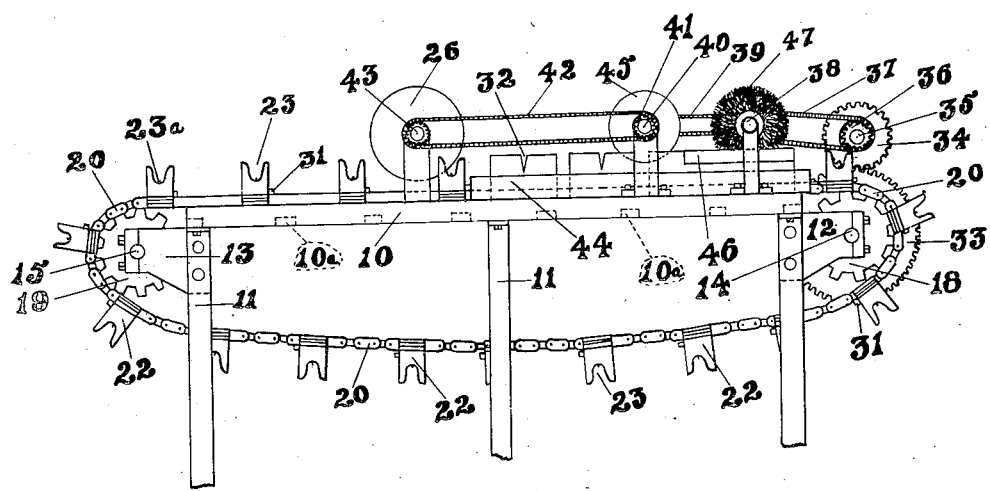
FIG. 1.
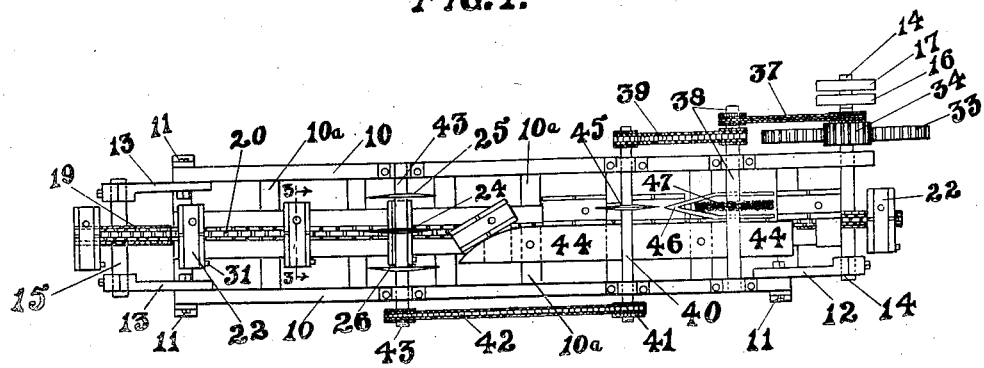
FIG. 2.
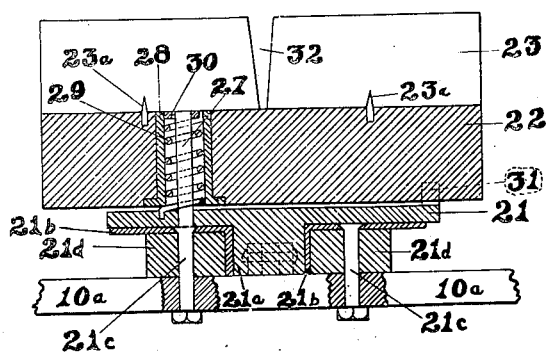
FIG. 3.
FIG. 4.
MERVIN O. PALMER
INVENTOR
BY
HIS ATTORNEY Patented Sept. 25, 1934

1,975,018

UNITED STATES PATENT OFFICE 1,975,018

FISH CUTTING AND CLEANING MACHINE

Mervin O. Palmer, San Pedro, Calif., assignor, by mesne assignments, to Continental Can Company, Inc., a corporation of New York Application November 5, 1929, Serial No. 404,946

4 Claims. (Cl. 17—3)

This invention relates, generally, to new and useful improvements in machines for cutting and cleaning fish and, more particularly, to a machine for cutting the fish transversely into pieces of such length as to approximate the length or depth of the can in which they are to be packed and for removing the entrails from the fish.

An object of the invention is to provide a machine which operates automatically to sever both the head and the tail from the fish, to sever the body portion transversely, to slit the belly portion and to remove the entrails.

More specific objects of the invention are to provide a machine of the above stated type, in which a series of carriers present the fish singly and in succession to the severing and cleaning devices; in which the slitting device is so arranged as to cut through the belly of the fish in a direction from the tail portion toward the head portion, and in which the slitting means operates to separate or spread the walls of the visceral cavity so as to facilitate the operation of the device for removing the entrails.

These and other objects will in part be obvious and will in part be hereinafter more fully disclosed.

While the principles of my invention may be embodied in various structures which differ in their details, that shown in the accompanying drawing is my present preferred form. It is to be understood, however, that the claims appearing herein are not intended to be limited to any specific structure any farther than is made necessary by the specific terms employed therein.

In the drawing, Fig. 1 is a side elevation and Fig. 2 a plan view of my invention; Fig. 3 is a longitudinal sectional view through one of the fish carriers and the cleat upon which it is pivoted, as at the line 3—3 of Fig. 2, said view also showing portions of the guiding and supporting members, and Fig. 4 is a detail view showing the cutters for severing the fish transversely and one of the carriers for the fish.

Describing the invention by reference to the drawing, 10 represents the longitudinal members of the frame, the same being suitably supported, as upon legs 11. At intervals, the side members are connected by cross members 10ª. Journaled at each end of the frame in brackets 12 and 13, respectively, are shafts 14 and 15. Although power for driving may be applied at any suitable point and any suitable driving means may be employed, I have shown fast and loose pulleys, 16 and 17, respectively, on the shaft 14, it being understood that a driving belt, not shown, cooperates with these pulleys in the usual way.

Rigidly secured to each of the shafts 14 and 15, substantially midway between the side members 10 of the frame, is a sprocket wheel, that on the driving shaft being designated 18 and that on the shaft 15 being designated 19. Over these sprocket wheels passes an endless chain 20. Attached to and forming parts of the chain is a series of equidistantly spaced cleats, one of the same being shown in section at 21 in Fig. 3. These cleats are preferably made of steel and are interposed in the chain to form parts of the links thereof. On their lower sides they are each provided with downwardly extending lugs 21ª which slide between angle-iron guide rails 21ᵇ, which are supported upon the cross members 10ª and are secured thereto by bolts 21ᶜ, the heads of which are countersunk into the angle irons, as shown. The guide rails are made rigid by suitable fillers 21ᵈ between them and the cross members.

Pivoted upon each of the cleats 21 is a member 22 for holding or carrying a single fish while undergoing treatment. Each carrier is deeply grooved at 23 in its outer longitudinal surface to receive a fish, the latter being held against lengthwise movement by sharpened pins 23ª which impale the body at each side of its transverse center. The fish are fed to the carriers at or adjacent the left-hand end of the machine, as viewed in Fig. 1, with their belly portions up and their heads and tails projecting beyond the carrier, as indicated in Fig. 4. In this position and in this manner, they are moved one after another toward the severing devices 24, 25 and 26. During this movement toward and past these devices, the carriers extend cross-wise or at right angles to their direction of travel. Then they are temporarily swung upon their pivots through an angle of ninety degrees, so that they move end-on with the head portion end of the fish in advance.

In Fig. 3, I have shown the pivot between one of the cleats 21 and its respective carrier 22. It comprises a pin 27, secured in the cleat, which projects outwardly through a relatively large hole in the carrier, the hole being lined with a bushing 28. Within the bushing and surrounding the pin is a helical spring 29, the same having one of its ends anchored in the cleat and its opposite end engaged within a notch in the bushing. The bushing is rigidly mounted in the carrier, being centrally positioned about the pin 27 by a circular nut 30 which is threaded onto the outer end of the pin and is fitted within the bushing. The spring is normally tensed in the direction for holding the carrier in its first described position and against a stop 31 on its respective cleat 21.

As will be clear from Fig. 4, the cutters 25 and 26 sever the head and the tail, respectively. The fish is so positioned in its carrier that, irrespective of its length, the head is severed in substantially the place indicated in Fig. 4. If a fish be longer than the average, part of the body will be cut off with the tail portion; but this part of the body may be salvaged and used as filler in packing the fish in their cans. The central cutter 24 severs the fish substantially midway between the head and tail portions, a deep notch 32 being formed through the outer part of the carrier at right angles to the groove 23 to permit the cutter 24 to pass therethrough.

In the machine shown, all the cutters are in the form of rotary disks. These may be driven in any suitable manner, that illustrated comprising a gear 33 on the drive shaft 14 which meshes with a smaller gear 34 on a shaft 35 which is suitably mounted on the machine frame. The shaft 35 is provided with a sprocket wheel 36, over which a chain 37 passes and extends about a sprocket wheel on a transverse shaft 38. The latter shaft is provided with a second sprocket, over which passes a chain 39 which extends about a sprocket on one end of a shaft 40. This shaft is extended across the machine; and, on its opposite end, it is provided with another sprocket 41 over which passes a chain 42 which turns a sprocket on the shaft 43 upon which the cutting disks 24, 25 and 26 are mounted. From a consideration of the driving connections just described and an inspection of Fig. 1, it will be seen that, whereas the gear 33 is turned in the clock-wise direction to advance the fish toward the cutters, the latter are rotated much more rapidly and in the opposite direction.

Substantially as soon as a carrier 22 has passed the cutters on the shaft 43, it is turned through a right angle by contacting with a stationary cam and guide 44, as shown in Fig. 2. The pivot between the carrier and its cleat 21 is so positioned as to cause the carrier to wipe against the cam-shaped end of the guide 44 and be turned, the said guide then holding the carrier in its turned position as it advances toward the sprocket wheel 18. This turning movement of the carrier is effected in order to bring the severed fish into proper position for the cutter 45 to slit the belly portion as the fish is moved past it, the said cutter being mounted on the shaft 40. As soon as the belly is thus slit, the point of a suitably supported wedge-shaped spreader 46 enters the slit; and as the fish is carried along, the sides are spread apart to enable the brush 47 to remove the entrails, the brush being located in the plane of the slitting cutter 45. The brush is secured to the shaft 38, and its brush elements or bristles are long enough to reach down through the spreader and into the visceral cavity to sweep it clean.

As soon as the carrier has passed the guide 44, the spring 29 snaps the carrier back into its transverse position against the stop 31 on its respective cleat so that it is again in position for receiving a fish as soon as it is carried about and above the sprocket 19. The cleaned fish is removed or is dropped from its carrier and the impaling pins as it passes about the sprocket 18.

It will be noted from the drawing that the brush for removing the entrails is located within the spreader and will operate to remove the entrails while the walls of the visceral cavity are held separated from each other.

Having thus described the preferred form of my invention, I claim:—

1. A fish cutting and cleaning machine including in combination severing devices for severing the head and tail from the body of the fish and for severing the body intermediate the ends thereof, a device for slitting the belly portion, means for spreading the walls of the visceral cavity, devices for removing the entrails, an endless conveyor, a series of carriers mounted thereon so as to swing from a position at right angles to the conveyor to a position longitudinal thereof, means for yieldingly holding the carrier in a position at right angles to the conveyor for presenting the fish to the body severing devices, and means for turning the carrier to its longitudinal position for presenting the fish to the belly slitting device and the means for spreading the walls and removing the entrails.

2. A fish cutting and cleaning machine including in combination severing devices for severing the head and tail from the body of the fish and for severing the body intermediate the ends thereof, a device for slitting the belly portion, means for spreading the walls of the visceral cavity, devices for removing the entrails, an endless conveyor, a series of carriers mounted thereon so as to swing from a position at right angles to the conveyor to a position longitudinal thereof, a spring associated with each carrier for automatically turning the carrier to its position at right angles to the conveyor, and a guide adapted to engage the carrier for moving the same into a position longitudinal of the conveyor, said guide being so positioned that the fish is presented to the body severing devices with the carrier at right angles to the conveyor and to the other devices with the carrier positioned longitudinally of the conveyor.

3. A fish cutting and cleaning machine including in combination severing devices for severing the head and tail of the fish, a slitting device for slitting the belly portion of the fish, devices for removing the entrails, an endless conveyor, a series of carriers mounted thereon so as to swing from a position at right angles to the conveyor to a position longitudinal thereof, a spring associated with each carrier for normally holding said carrier in a position at right angles to the conveyor, and a guide for engaging the carrier for swinging the same to a position longitudinal of the carrier, said guide being so disposed that the fish is presented to the body severing devices with the carrier at right angles to the conveyor and to the slitting device and the devices for removing the entrails with the carrier in a position longitudinal of the conveyor with the head portion of the fish advancing.

4. A fish cutting and cleaning machine including in combination rotating severing devices for severing the head and tail from the body of the fish, a rotating device for slitting the belly portion, means for spreading the walls of the visceral cavity, devices for removing the entrails, an endless conveyor, a series of carriers mounted thereon so as to swing from a position at right angles to the conveyor to a position longitudinally thereof, means for turning said carrier to a position at right angles to the conveyor for presenting the fish to the head and tail severing devices and for subsequently turning the carrier to a position longitudinally of the conveyor for presenting the fish to the belly slitting devices, the means for spreading the walls, and the means for removing the entrails.

MERVIN O. PALMER.